US006755898B2

(12) United States Patent
Park et al.

(10) Patent No.: US 6,755,898 B2
(45) Date of Patent: Jun. 29, 2004

(54) OXYGEN-ENRICHED AIR SUPPLYING APPARATUS

(75) Inventors: Kwan Choul Park, Gwangmyeong-si (KR); Jung Hwan Song, Incheon (KR); Se Yong Park, Suwon-si (KR)

(73) Assignee: Daewoo Electronics Corporation (KR)

( * ) Notice: Subject to any disclaimer, the term of this patent is extended or adjusted under 35 U.S.C. 154(b) by 23 days.

(21) Appl. No.: 10/318,462

(22) Filed: Dec. 13, 2002

(65) Prior Publication Data

US 2004/0016344 A1 Jan. 29, 2004

(30) Foreign Application Priority Data

| Jul. 26, 2002 | (KR) | 10-2002-0044196 |
| Jul. 26, 2002 | (KR) | 20-2002-0022391 |
| Jul. 26, 2002 | (KR) | 20-2002-0022392 |
| Jul. 26, 2002 | (KR) | 10-2002-0044195 |

(51) Int. Cl.[7] .......................... B01D 53/22; B01D 63/02
(52) U.S. Cl. ................ 96/4; 96/8; 96/10; 96/222
(58) Field of Search ................ 95/54; 96/4, 8, 96/10, 14, 222

(56) References Cited

U.S. PATENT DOCUMENTS

| 3,022,858 A | * | 2/1962 | Tillyer et al. ............... 95/12 |
| 3,976,451 A | * | 8/1976 | Blackmer et al. ............. 96/7 |
| 4,174,955 A | * | 11/1979 | Blackmer et al. ............. 96/7 |
| 4,597,781 A | * | 7/1986 | Spector ...................... 96/52 |
| 4,704,139 A | * | 11/1987 | Yamamoto et al. ............ 55/3 |
| 4,871,379 A | * | 10/1989 | Edwards .................... 55/158 |
| 4,950,315 A | * | 8/1990 | Gollan ...................... 55/158 |
| 5,129,924 A | * | 7/1992 | Schultz ....................... 96/4 |
| 5,158,584 A | * | 10/1992 | Tamura ...................... 96/8 |
| 5,240,487 A | * | 8/1993 | Kung ........................ 55/486 |
| 5,282,964 A | * | 2/1994 | Young et al. ............. 210/321.8 |
| 5,282,966 A | * | 2/1994 | Walker ................... 210/321.8 |
| 5,501,212 A | * | 3/1996 | Psaros ................... 128/205.12 |
| 5,702,507 A | * | 12/1997 | Wang ......................... 96/55 |
| 5,709,732 A | * | 1/1998 | Prasad ........................ 95/45 |
| 5,735,918 A | * | 4/1998 | Barradas .................... 96/222 |
| 6,427,484 B1 | * | 8/2002 | Choi et al. ................. 62/640 |
| 6,478,852 B1 | * | 11/2002 | Callaghan et al. ............. 95/54 |

FOREIGN PATENT DOCUMENTS

| GB | 2122103 A | * | 1/1984 |
| GB | 2257054 A | * | 1/1993 |
| JP | 59-212632 A | * | 12/1984 |
| JP | 60-264309 A | * | 12/1985 |
| JP | 62-110727 A | * | 5/1987 |
| JP | 63-008204 A | * | 1/1988 |
| JP | 01-236913 A | * | 9/1989 |
| JP | 01-274824 A | * | 11/1989 |
| JP | 01-281124 A | * | 11/1989 |
| JP | 01-281126 A | * | 11/1989 |
| JP | 02-160006 A | * | 6/1990 |
| JP | 02-221102 A | * | 9/1990 |
| JP | 02-252609 A | * | 10/1990 |
| JP | 02-263704 A | * | 10/1990 |
| JP | 02-263705 A | * | 10/1990 |
| JP | 03-242304 A | * | 10/1991 |
| JP | 03-242305 A | * | 10/1991 |
| JP | 03-247502 A | * | 11/1991 |

* cited by examiner

Primary Examiner—Robert H. Spitzer
(74) Attorney, Agent, or Firm—Anderson Kill & Olick, PC

(57) ABSTRACT

An apparatus for supplying an oxygen-enriched air includes hollow membrane units spaced apart from each other, for separating a surrounding air thereof into an oxygen-enriched air and a nitrogen-enriched air, a vacuum pump for sucking in the surrounding air via the separation membrane units to draw in and provide the oxygen-enriched air, and an oxygen-enriched air discharging unit for discharging the oxygen-enriched air. Each of the hollow separation membrane units is of generally a thin cuboidal shape, and the vacuum pump and the oxygen-enriched air discharging unit communicate with each other.

14 Claims, 6 Drawing Sheets

OXYGEN-ENRICHED AIR SUPPLYING APPARATUS

FIELD OF THE INVENTION

The present invention relates to an oxygen-enriched air supplying apparatus; and, more particularly, to an oxygen-enriched air supplying apparatus suitable for an air treating device such as an air conditioner, an air cleaner or the like.

BACKGROUND OF THE INVENTION

An air treating device, e.g., an air conditioner, is widely used to treat the air in a closed room. However, when the room is maintained in a closed state for a long time, a variety of side effects, e.g., breathing difficulty, headache, weakening of memory, etc., may be caused to the people therein.

As an effort to ameliorate these problems, apparatuses for supplying an oxygen-enriched air to a room have been developed. One of them is disclosed in U.S. Pat. No. 6,427,484 entitled "AIR CONDITIONER HAVING OXYGEN-ENRICHED DEVICE".

Referring to FIGS. 1 and 2, there are shown a schematic view of a prior art oxygen-enriched air supplier and a lateral cross sectional view of a separator 50 included in the oxygen-enriched air supplier.

As shown in FIG. 1, the oxygen-enriched air supplier includes an air compressor 10, a muffler 20, a first and a second filter assembly 30 and 40, an oxygen-enriched air separator 50 and a connection pipe 60 for connecting the air compressor 10, the muffler 20, the filter assemblies 30 and 40, an oxygen-enriched air separator 50 with each other, and an oxygen-enriched air discharging pipe 70.

The air compressor 10 is installed at one side of an outdoor unit (not shown) of an air conditioner (not shown) to compress the air introduced from the outside.

The muffler 20 is provided near a suction unit (not shown) of the air compressor 20 to reduce noises generated when exterior air is introduced into the air compressor 10.

The first and the second filter assembly 30 and 40 are installed in the connection pipe 60 at locations between the air compressor 10 and the oxygen-enriched air separator 50 to remove impurities contained in the air compressed by the air compressor 10. Further, the first filter assembly 30 removes a pulsating pressure of the compressed air generated from the air compressor 10 and the second filter assembly 40 eliminates condensed water from the compressed air.

Referring to FIG. 2, the oxygen-enriched air separator 50 includes a main body 51, a plurality of separation membranes 57 and a narrow tube 58 acting as a pressure maintenance means. The main body 51 is a hollow cylinder-shaped member and the separation membranes 57 are accommodated within the main body 51 by using a pair of bulk heads 80. Each of the separation membranes 57 is a cylindrical tube with two open ends. The inside of the main body 51 is divided by the bulk heads 80 and the separation membranes 57 into a first space 52 communicating with the inside of the separation membranes 57 and a second space 53 communicating with the outside of the separation membranes 57. Furthermore, the main body 51 has an oxygen-enriched air inlet port 54 and a nitrogen-enriched air outlet port 55 communicating with the first spaces 52, respectively, and an oxygen-enriched air outlet port 56 communicating with the second space 53. The ports 54, 55 and 56 are respectively connected to the connection pipe 60, the narrow tube 58 and the oxygen-enriched air discharging pipe 70.

The oxygen-enriched air supplier starts to operate when an oxygen-enriched air supplying function is chosen in a manual operation mode or an automatic operation mode.

Supply of the oxygen-enriched air is triggered by an operation of the air compressor 10. The air from the outside of the room is introduced into and compressed by the air compressor 10 after it passes through the muffler 20. During this time, the muffler 20 reduces noises generated when the air is introduced into the air compressor 10. The compressed air is introduced through the connection pipe 60 to the oxygen-enriched air separator 50. While the compressed air travels through the connection pipe 60, the first and the second filter assembly 30 and 40 remove impurities and condensed water from the compressed air.

Thus impurity-removed air is introduced into the oxygen-enriched air separator 50 via the oxygen-enriched air inlet port 54. Thereafter, the introduced air moves from one of the first space 52 to the other thereof. During this time, some of the air permeates the separation membranes 57 and moves from the first space 52 to the second space 53, and the remaining air stays in the first space 52. The air passing through the separation membranes 57 is an oxygen-enriched air and the remaining air in the first space 52 is a nitrogen-enriched air. The oxygen-enriched air is discharged into the room through the oxygen-enriched air outlet port 56 and the oxygen-enriched air discharging pipe 70, while the nitrogen-enriched air is exhausted to the outside of the room through the nitrogen-enriched air outlet port 55 and the narrow tube 58.

In such an oxygen-enriched apparatus, a separation efficiency of the ordinary air into the oxygen-enriched air is low, since the compressor serving as a motive power of the separation operation is disposed at the inlet side of the separator.

Moreover, it is difficult to fabricate the separators since the separator has a cylindrical shape as well as complicated structure. Furthermore, it is cumbersome to perform the sealing between the bulk heads and the main body, and/or between the bulk heads and the separation membranes.

SUMMARY OF THE INVENTION

It is, therefore, a primary object of the present invention to provide an oxygen-enriched supplying apparatus having an improved separation efficiency of separating an oxygen-enriched air from an atmospheric air.

It is another object of the present invention to provide an oxygen-enriched supplying apparatus having separators capable of being simply manufactured.

In accordance with an aspect of the present invention, there is provided an apparatus for supplying an oxygen-enriched air, comprising:

one or more hollow membrane units spaced apart from each other, for separating a surrounding air thereof into an oxygen-enriched air and a nitrogen-enriched air;

an oxygen-enriched air suction means for sucking in the surrounding air via the separation membrane units to draw in and provide the oxygen-enriched air; and an oxygen-enriched air discharging unit for discharging the oxygen-enriched air.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Figure 1:
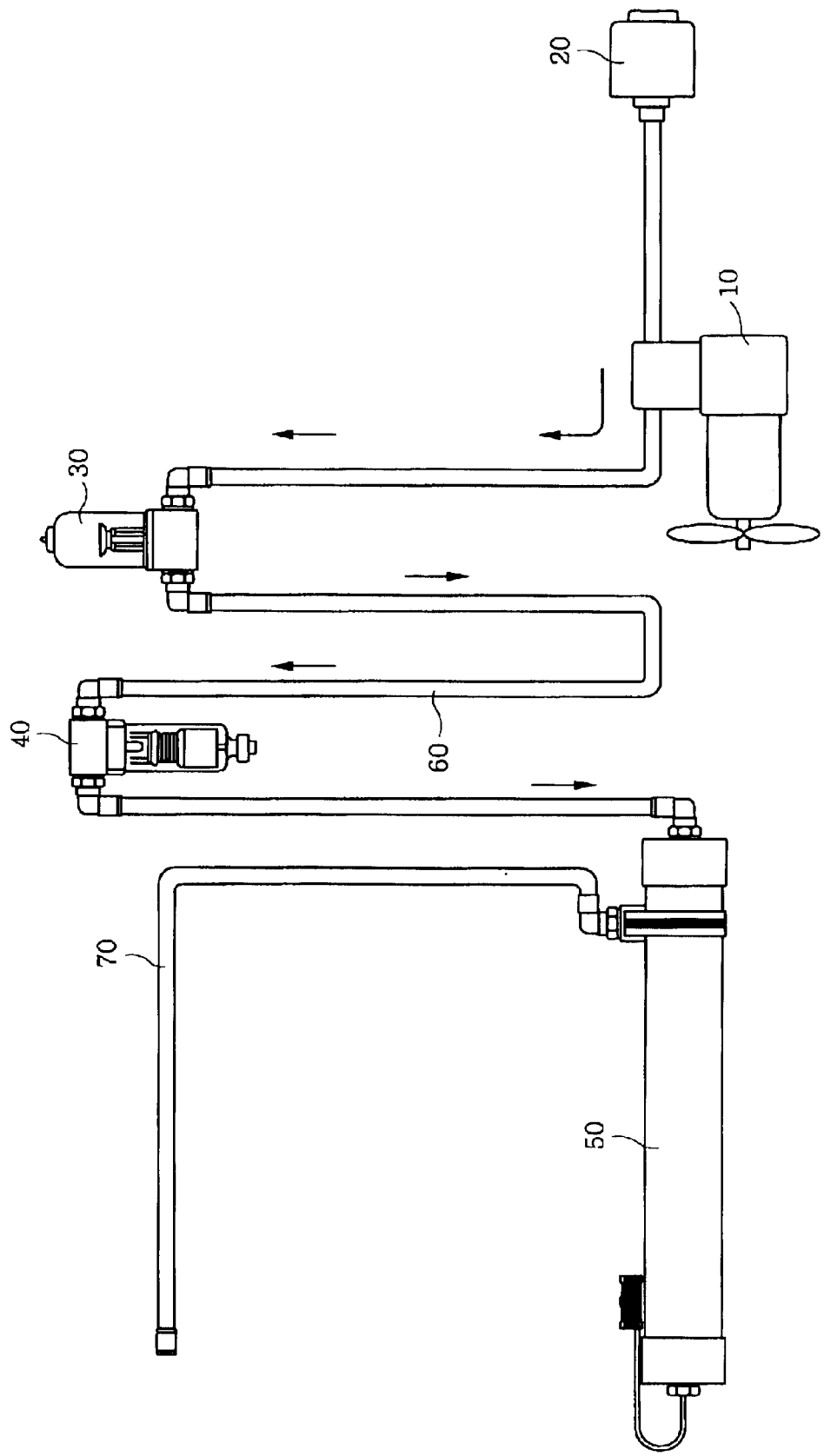
FIG. 1 is a schematic view of a prior art oxygen-enriched air supplier.
Figure 2:
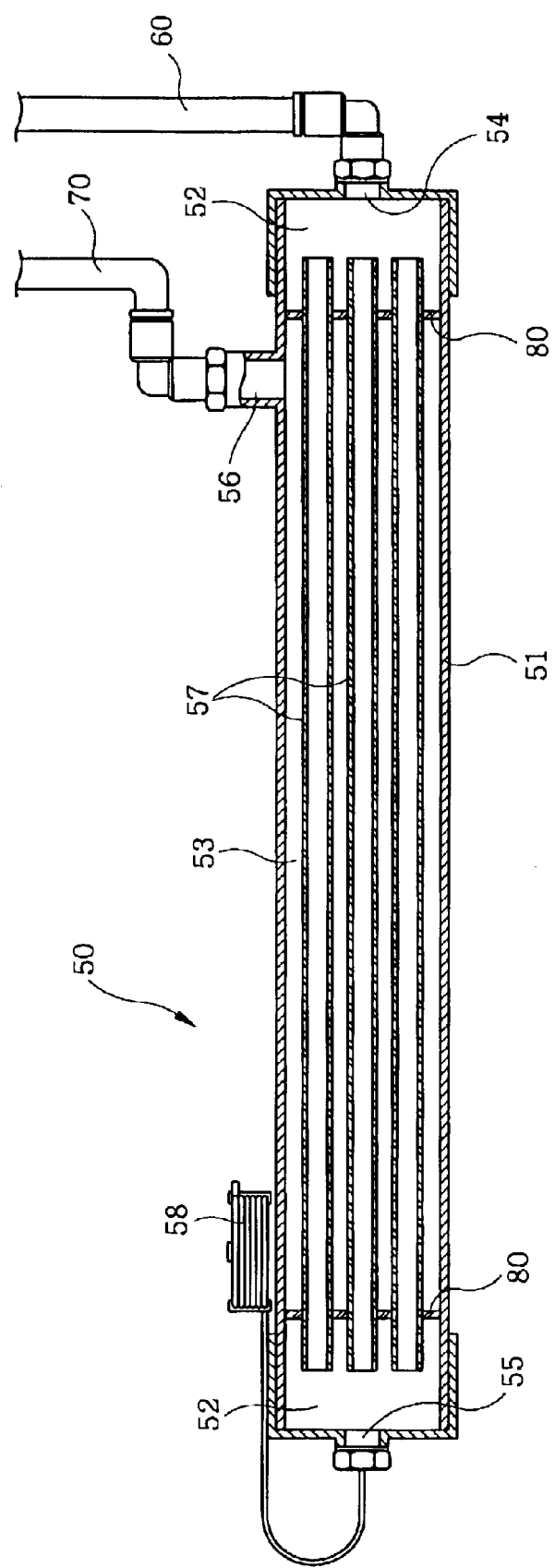
FIG. 2 shows a lateral cross sectional view of separation membranes included in the oxygen-enriched air supplier shown in FIG. 1.
Figure 3:
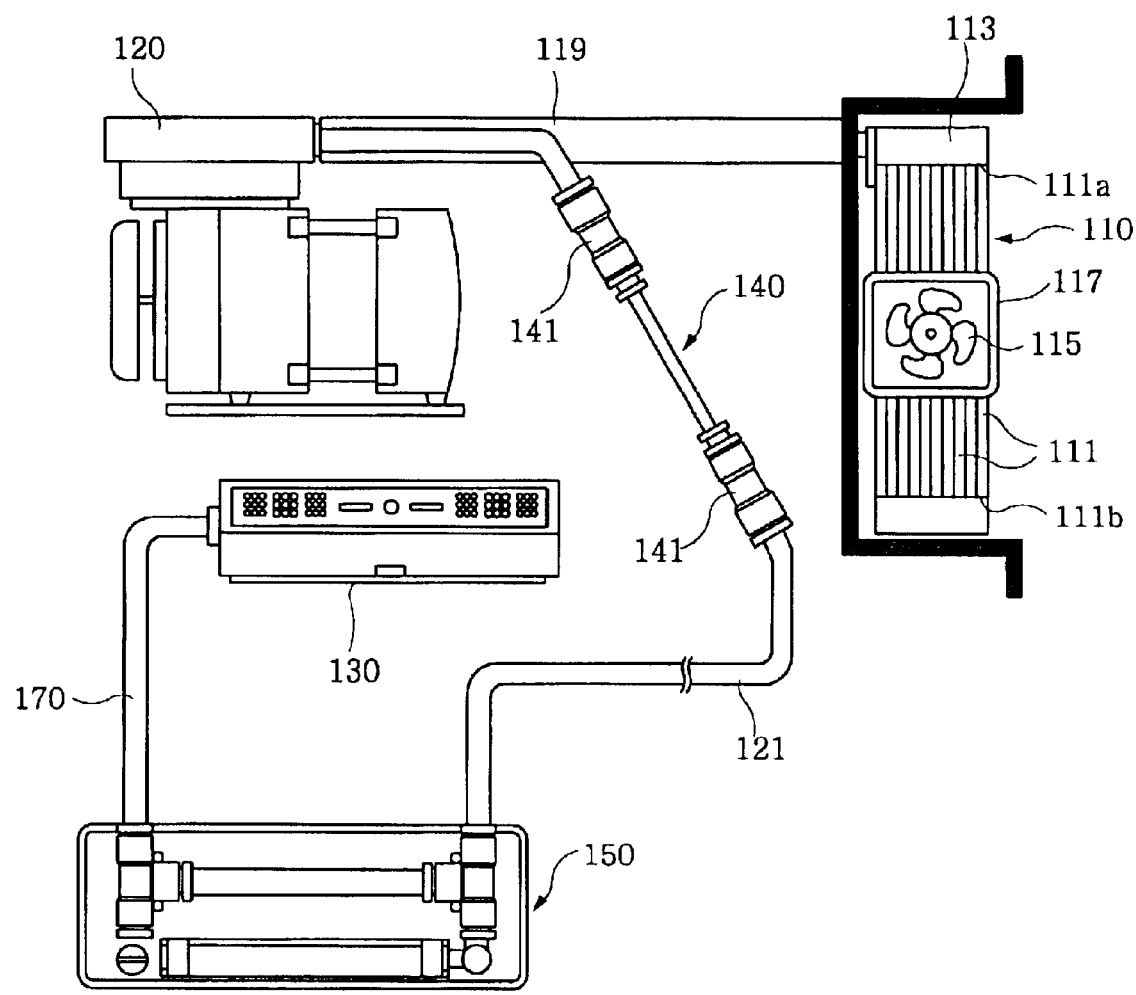
FIG. 3 depicts a schematic view of an oxygen-enriched air supplying apparatus in accordance with the present invention.
Figure 4:
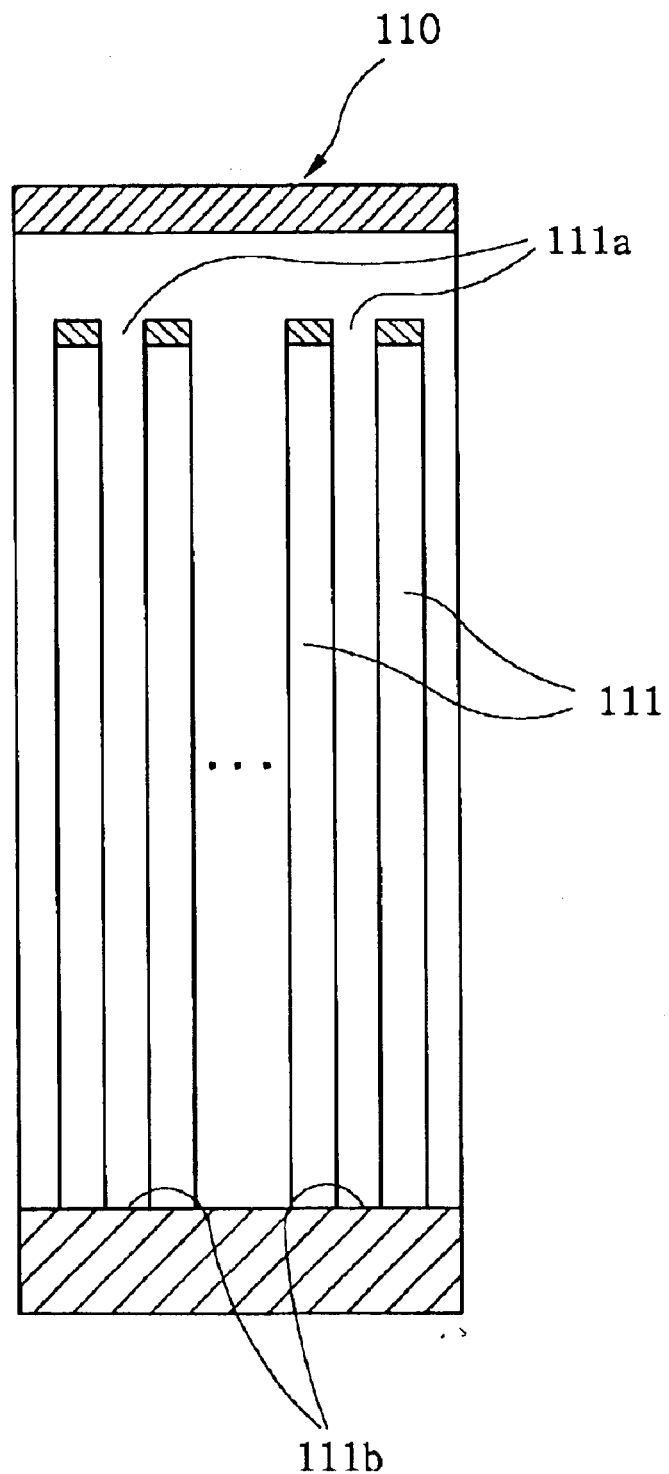
FIG. 4 presents a construction of a separator included in the oxygen-enriched air supplying apparatus in accordance with the present invention.

Referring to FIGS. 3 and 4, there are shown a schematic view of an apparatus for supplying an oxygen-enriched air in accordance with the present invention and an expanded view of "A" in FIG. 3, respectively.

As shown in FIG. 3, the inventive oxygen-enriched air supplying apparatus includes a separator 110, a vacuum pump 120 connected with the separator 110, and an oxygen-enriched air discharging unit 130 communicating with the vacuum pump 120.

The separator 110 includes one or more hollow separation membrane units 111 for separating a surrounding air into an oxygen-enriched air and a nitrogen-enriched air and a connection space 113 for connecting the separation membrane units 111 with the vacuum pump 120. The separation membrane units 111 having a thin cuboidal shape are parallel spaced apart from each other and are made of materials with high selective permeability of oxygen over any other elements in the air, e.g., silicon base, olefin base, fluoric base or phenylene-ether base polymer. As shown in FIG. 4, each of the separation membrane units 111 has an open end 111a and a blind end 111b, and the connection space 113 communicates with inside spaces of the separation membrane units 111 through the open ends 111a. Returning to FIG. 3, the separator 110 may further include a blower 115 for removing the nitrogen-enriched air separated by the separation membrane units 111 and supplying a fresh air thereto, and a frame 117 installed in the separation membrane units 111. The blower 115 is installed in the separation membrane units 111 through the frame 117 to remove the nitrogen-enriched air close to the separation membrane units 111.

The vacuum pump 120, which communicates with the connection space 113 through a first oxygen-enriched air passage 119, sucks in the surrounding air of the separation membrane units 111 therethrough to draw in and provide the oxygen-enriched air separated from the surrounding air.

The oxygen-enriched air discharging unit 130 communicates with the vacuum pump 120 via a second oxygen-enriched air passage 121. The oxygen-enriched air discharging unit 130 serves to discharge the oxygen-enriched air to a desired place.

Figure 5:
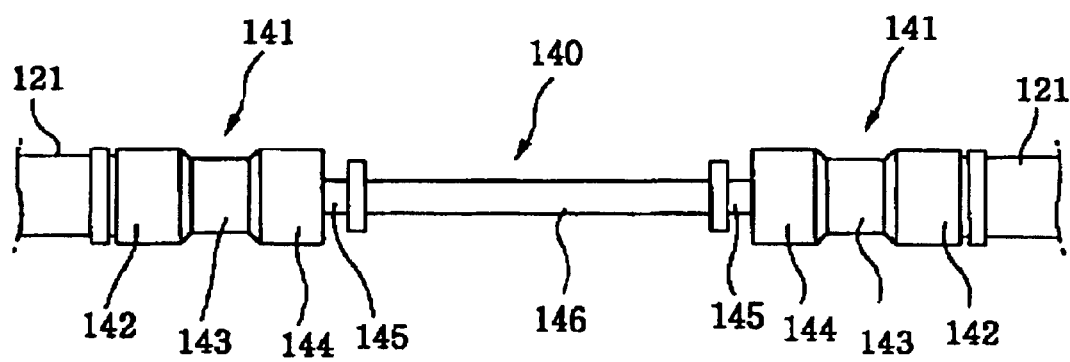
FIG. 5 describes a construction of a vibration damping device included in the oxygen-enriched air supplying apparatus in accordance with the present invention.

The present invention may further include a vibration damping device 140 for damping vibrations induced by the vacuum pump 120. The vibration damping device 140 is installed in the second oxygen-enriched air passage 121 between the vacuum pump 120 and the oxygen-enriched air discharging unit 130. Furthermore, the vibration damping device 140 includes a pair of vibration damping pipes 141 and a connection tube 146 provided therebetween as shown in FIG. 5. Each of the vibration damping pipes 141 has four continuous diameter portions 142 to 145, the diameter portions 143 to 145 being different in their diameters from each other. That is, a first diameter portion 142 has a larger diameter than that of the second oxygen-enriched air passage 121; a second diameter portion 143 has a smaller diameter than that of the first diameter portion 142; a third diameter portion 144 has a diameter ranging from that of the second diameter portion 143 to that of the first diameter portion 142; and a fourth diameter portion 145 has a smaller diameter than that of the second diameter portion 143. The connection tube 146 has a smaller diameter than that of the fourth diameter portion 145 and is disposed between the fourth diameter portions 145 of the vibration damping pipes 141. Such a gradual change in the diameters enables to raise a damp efficiency of vibrations and also to minimize damages to the vibration damping device.

In foregoing description, the vibration damping pipes 141 has been described as having a circular shape, but they may have a polygonal shape.

The present invention may still further include an aromatic material adding unit 150 for selectively supplying an aromatic material to the desired place. In this case, the aromatic material adding unit 150 communicates with a fourth oxygen-enriched air passage 170 (see FIG. 3) as will be described later.

Figure 6A:
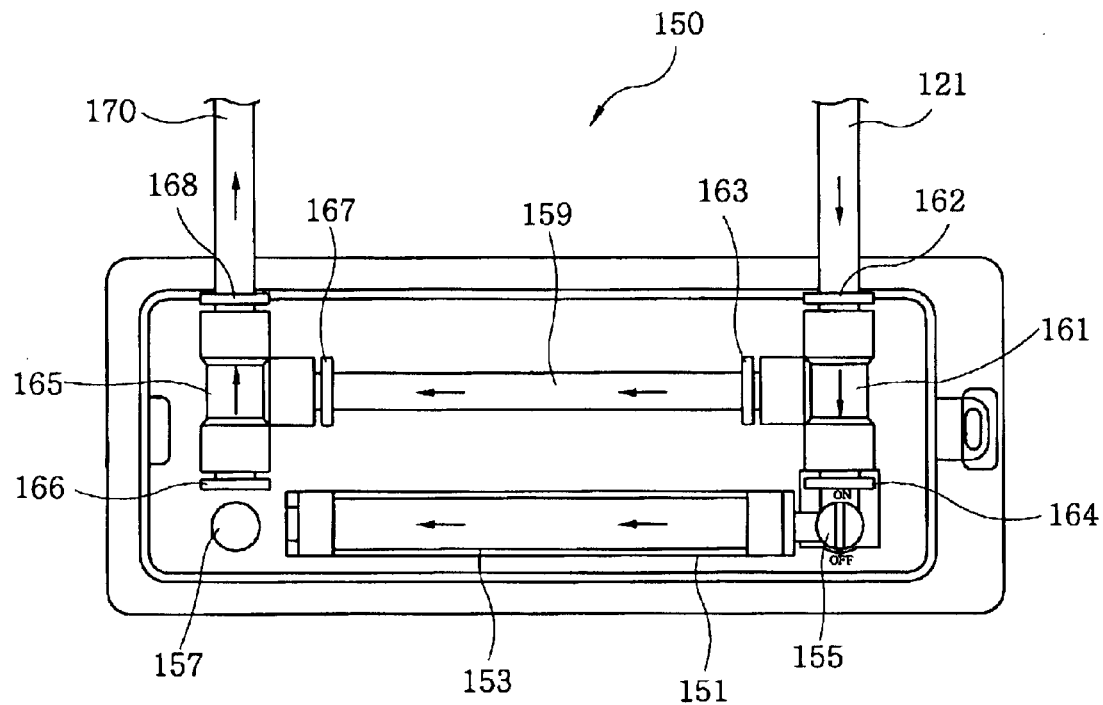
FIGS. 6A and 6B offer views for setting forth an oxygen-enriched air flow in an aromatic material adding unit included in the inventive oxygen-enriched air supplying apparatus.
Figure 6B:
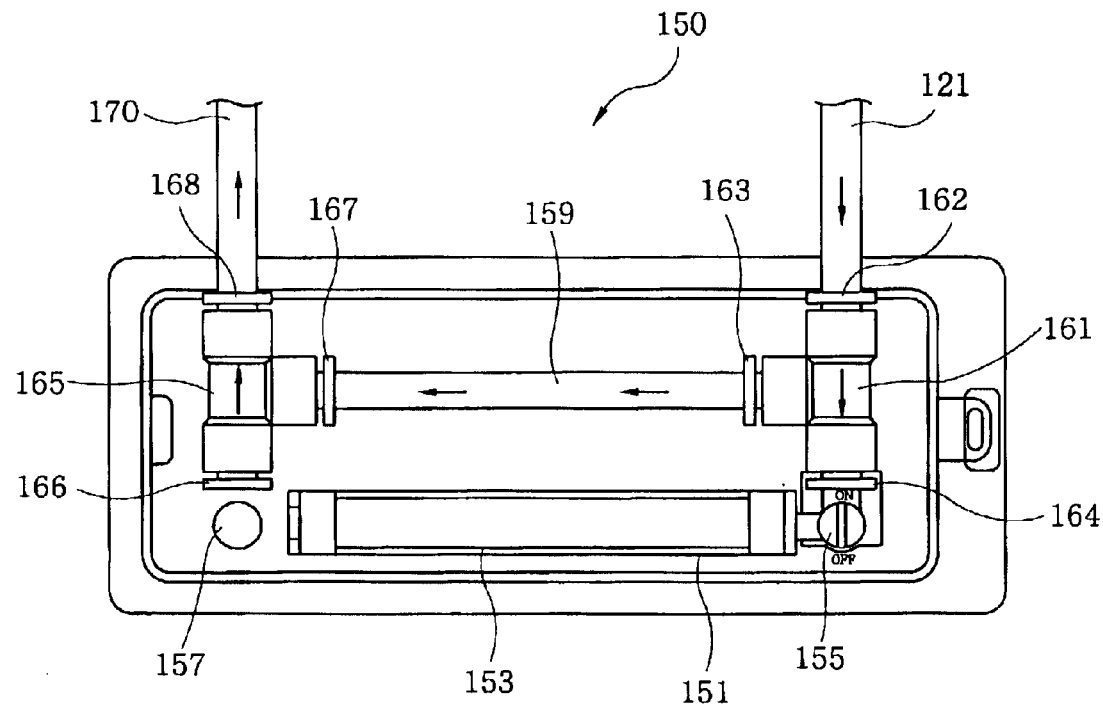

The aromatic material adding unit 150 is installed between the second oxygen-enriched air passage 121 and the oxygen-enriched air discharging unit 130. As shown in FIG. 6A, the aromatic material adding unit 150 includes a scent casing 151 having a material 153 embedding therein an aromatic material to be mixed with the oxygen-enriched air, a selective communicator 155 for selectively introducing the oxygen-enriched air into the scent casing 151, e.g., an on and off valve or a solenoid valve, and an adjustor 157 for adjusting or controlling the amount of a mixture of the oxygen-enriched air and the aromatic material to be provided to the oxygen-enriched air discharging unit 130. The aromatic material adding unit 150 further includes a first and a second coupling 161 and 165. The first coupling 161 has three ports, wherein a first, a second and a third port 162 to 164 communicate with the second oxygen-enriched air passage 121, one end of a third oxygen-enriched air passage 159 as will be described later, and one end of the scent casing 151, respectively. Similarly, the second coupling 165 has three ports, wherein a fourth, a fifth and a sixth port 166 to 168 communicate with the other end of the scent casing 151, the other end of the third oxygen-enriched air passage 159, and the fourth oxygen-enriched passage 170 connected to the oxygen-enriched air discharge device, respectively. The selective communicator 155 and the adjustor 157 are respectively provided between the third port 164 and the scent casing 151 and between the casing 151 and the fourth port 166. If the selective communicator 155 is activated, the second oxygen-enriched air passage 121 communicates with the scent casing 151. If not, the second oxygen-enriched air passage 121 does not communicate with the scent casing 151. The aromatic material embedded material 153 is fabricated by, e.g., impregnating a porous material, such as Ni, Au, Ag, Cu, Cu—Zn alloy or the like with the aromatic material.

An operation of the oxygen-enriched supplying apparatus will now be described.

When the vacuum pump 120 is activated, the surrounding air of the separation membrane units 111 is suck therethrough to be separated into the nitrogen-enriched air and the oxygen-enriched air. The nitrogen-enriched air remains close to the separation membrane units 111. If necessary, the nitrogen-enriched air is removed by operating the blower 115. The oxygen-enriched air is drawn to the vacuum pump 120 via both of the connection space 113 communicating with the open ends 111a of the separation membrane units 111 and the first oxygen-enriched air passage 119. Then, the oxygen-enriched air flows to the aromatic material adding unit 150 through the second oxygen-enriched air passage 121. During this time, vibrations due to the vacuum pump 120 are damped by the vibration damping device 140 disposed in the second oxygen-enriched air passage 121. Specially, since the diameter portions provided in the vibration damping device 140 have a various diameter, it is possible to efficiently damp the vibrations.

Subsequently, the oxygen-enriched air flows into the aromatic material adding unit 150 via the first port 162 of the first coupling 161 communicating with the second oxygen-enriched air passage 121. During this time, if only the oxygen-enriched air is intended to flow, the selective communicator 155 is not activated. Accordingly, the oxygen-enriched air flows to the oxygen-enriched air discharging unit 130 through the third oxygen-enriched air passage 159 connected to the second port 163 of the first coupling 161, the fifth port 167 of the second coupling 165 connected to the third oxygen-enriched air passage 159, and the fourth oxygen-enriched air passage 170 connected to the sixth portion of the second coupling 165 in this order. On the other hand, when the mixture of the oxygen-enriched air and the aromatic material is required, the selective communicator 155 is activated to make the second oxygen-enriched air passage 121 communicate with the scent casing 151. In this case, the oxygen-enriched air flows into the scent casing 151 to be mixed with the aromatic material embedded in the material 153. As a result, the mixture of the oxygen-enriched air and the aromatic material flows into the oxygen-enriched air discharging unit 130 via the fourth port 166 of the second coupling 165 connected to the scent casing 151, the sixth port 168 thereof connected to the fourth oxygen-enriched air passage 170 in this order. During this time, the amount of the oxygen-enriched air flowing into the oxygen-enriched air discharging unit 130 is controlled by the adjustor 157 installed between the fourth port 166 of the second coupling 165 and the scent casing 151.

Finally, the oxygen-enriched air or the mixture of the oxygen-enriched air and the aromatic material in the oxygen-enriched air discharge unit 130 is discharged to the desired place.

Since the vacuum pump functioning as a motive power of the separation operation is disposed at the outlet side of the separator as well as the blower for removing the residual nitrogen-enriched air near to the separation membrane units, a separation efficiency of the ordinary air into the oxygen-enriched air is highly improved.

In addition, it is easy to fabricate the separator since the separation membrane units incorporated therein is not of the cylindrical shape but of the cuboidal shape. Further, it does not require a separate member, e.g., the bulk heads or a cumbersome task, e.g., sealing in order to establish the separator.

While the present invention has been described with respect to certain preferred embodiments only, other modifications and variations may be made without departing from the scope of the present invention as set forth in the following claims.

What is claimed is:

1. An apparatus for supplying an oxygen-enriched air, comprising:
    one or more hollow separation membrane units spaced apart from each other, for separating a surrounding air thereof into an oxygen-enriched air and a nitrogen-enriched air;
    an oxygen-enriched air suction means for sucking in the surrounding air via said one or more hollow separation membrane units to draw in and provide the oxygen-enriched air, wherein the oxygen-enriched air suction means is a vacuum pump;
    an oxygen-enriched air discharging unit for discharging the oxygen-enriched air, the vacuum pump communicating with the oxygen-enriched air discharging unit; and
    a vibration damping device provided between the vacuum pump and the oxygen-enriched air discharging unit, for damping vibrations induced by the vacuum pump.

2. The oxygen-enriched air supplying apparatus of claim 1, wherein each of said one or more hollow separation membrane units is of generally a thin cuboidal shape having one open end through which the oxygen-enriched air is drawn.

3. The oxygen-enriched air supplying apparatus of claim 1, wherein each hollow separation membrane unit is made of a polymer.

4. The oxygen-enriched air supplying apparatus of claim 3, wherein the polymer is selected from the group consisting of a silicon base, an olefin base, a fluoric base, and a phenylene-ether base polymer.

5. The oxygen-enriched air supplying apparatus of claim 1, wherein the vibration damping device includes a pair of vibration damping pipes and a connection tube provided therebetween, each of the vibration damping pipes having a plurality of cross sections through which the oxygen-enriched air flows and the cross sections being different in their sectional areas from each other.

6. The oxygen-enriched air supplying apparatus of claim 5, wherein the cross sections include a first to a fourth cross sectional portion, the second cross sectional portion having a smaller cross sectional area than that of the first cross sectional portion, the third cross sectional portion having a cross sectional area ranging from that of the second cross sectional portion to that of the first cross sectional portion, and the fourth cross sectional portion having a smaller cross sectional area than that of the second cross sectional portion, and the connection tube having a cross sectional area smaller than that of the fourth cross sectional portion.

7. The oxygen-enriched air supplying apparatus of claim 6, wherein the cross-sectional portions are of a polygonal shape.

8. The oxygen-enriched air supplying apparatus of claim 6, wherein the cross sectional portions are of a circular shape.

9. The oxygen-enriched air supplying apparatus of claim 1, further comprising:
    an aromatic material adding unit for selectively supplying an aromatic material to the oxygen-enriched air discharging unit.

10. The oxygen-enriched air supplying apparatus of claim 9, wherein the aromatic material adding unit includes:
    a selective communicator for selectively introducing a portion of the oxygen-enriched air;

a scent casing having therein an aromatic material embedding material, for mixing the introduced portion of the oxygen-enriched air with the aromatic material; and an adjustor provided between the scent casing and the oxygen-enriched air discharging unit, for controlling the amount of a mixture of the oxygen-enriched air and the aromatic material to be provided to the oxygen-enriched air discharging device.

11. The oxygen-enriched air supplying apparatus of claim 10, wherein the selective communicator is an on and off valve or a solenoid valve.

12. The oxygen-enriched air supplying apparatus of claim 10, wherein the aromatic material adding unit further includes:

a passage for making the oxygen-enriched air pass through;

a pair of couplings communicating with the passage respectively, wherein one of the couplings has a first port for introducing the oxygen-enriched air, and a second and a third port connected to the passage and the scent casing respectively, and the other thereof has a fourth and a fifth port connected to the scent casing and the passage respectively, and sixth port for guiding the oxygen-enriched air and the mixture of the oxygen-enriched air and the aromatic material.

13. The oxygen-enriched air supplying apparatus of claim 1, further comprising:

means for removing the nitrogen-enriched air separated by said one or more hollow separation membrane units and supplying a fresh air thereto.

14. The oxygen-enriched air supplying apparatus of claim 13, wherein the nitrogen-enriched air removing means is a blower.

* * * * *